United States Patent
Ahlfeld et al.

(10) Patent No.: US 9,721,679 B2
(45) Date of Patent: Aug. 1, 2017

(54) NUCLEAR FISSION REACTOR FUEL ASSEMBLY ADAPTED TO PERMIT EXPANSION OF THE NUCLEAR FUEL CONTAINED THEREIN

(75) Inventors: Charles E. Ahlfeld, LaJolla, CA (US); John Rogers Gilleland, Kirkland, WA (US); Roderick A. Hyde, Redmond, WA (US); Muriel Y. Ishikawa, Livermore, CA (US); David G. McAlees, Bellevue, WA (US); Nathan P. Myhrvold, Medina, WA (US); Clarence T. Tegreene, Bellevue, WA (US); Thomas Allan Weaver, San Mateo, CA (US); Charles Whitmer, North Bend, WA (US); Lowell L. Wood, Jr., Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 2195 days.

(21) Appl. No.: 12/082,077

(22) Filed: Apr. 8, 2008

(65) Prior Publication Data

US 2009/0252283 A1    Oct. 8, 2009

(51) Int. Cl.
*G21C 3/00* (2006.01)
*G21C 3/42* (2006.01)
(Continued)

(52) U.S. Cl.
CPC ............... *G21C 3/42* (2013.01); *G21C 1/026* (2013.01); *G21C 3/16* (2013.01); *G21C 3/18* (2013.01);
(Continued)

(58) Field of Classification Search
USPC ................. 376/156, 158, 409, 451
See application file for complete search history.

(56) References Cited

U.S. PATENT DOCUMENTS 3,028,330 A * 4/1962 Huntington et al. ......... 376/427
3,184,392 A   5/1965 Blake
(Continued)

FOREIGN PATENT DOCUMENTS

JP    S5221598    2/1977
JP    S62293186   12/1987
(Continued)

OTHER PUBLICATIONS

PCT International Search Report; International App. No. PCT/US 09/02192; Aug. 13, 2009; pp. 1-2.
(Continued)

*Primary Examiner* — Marshall O'Connor

(57) ABSTRACT

A nuclear fission reactor fuel assembly adapted to permit expansion of the nuclear fuel contained therein. The fuel assembly comprises an enclosure having enclosure walls to sealingly enclose a nuclear fuel foam defining a plurality of interconnected open-cell voids or a plurality of closed-cell voids. The voids permit expansion of the foam toward the voids, which expansion may be due to heat generation and/or fission gas release. The voids shrink or reduce in volume as the foam expands. Pressure on the enclosure walls is substantially reduced because the foam expands toward and even into the voids rather than against the enclosure walls. Thus, the voids provide space into which the foam can expand.

21 Claims, 18 Drawing Sheets

(51) Int. Cl.
*G21C 1/02* (2006.01)
*G21C 3/16* (2006.01)
*G21C 3/28* (2006.01)
*G21C 3/18* (2006.01)
*G21C 3/64* (2006.01)

(52) U.S. Cl.
CPC ............... *G21C 3/28* (2013.01); *G21C 3/64* (2013.01); *Y02E 30/34* (2013.01); *Y02E 30/38* (2013.01)

(56) References Cited

U.S. PATENT DOCUMENTS

| | | |
|---|---|---|
| 3,274,068 A | 9/1966 | Koutz et al. |
| 3,294,643 A | 12/1966 | Guernsey |
| 3,322,644 A * | 5/1967 | Benson ............... 376/416 |
| 3,598,652 A | 8/1971 | Magladry |
| 3,619,428 A | 11/1971 | David |
| 3,625,823 A | 12/1971 | Kerr et al. |
| 3,936,350 A | 2/1976 | Borst |
| 3,992,258 A | 11/1976 | Tobin |
| 4,016,226 A | 4/1977 | Kosiancic |
| 4,131,511 A | 12/1978 | Mordarski et al. |
| 4,279,875 A | 7/1981 | Bray et al. |
| 4,285,891 A | 8/1981 | Bray et al. |
| 4,369,048 A | 1/1983 | Pence |
| 4,582,121 A | 4/1986 | Casey |
| 4,717,667 A | 1/1988 | Provonchee |
| 4,759,911 A | 7/1988 | Bingham et al. |
| 5,061,435 A | 10/1991 | Singh et al. |
| 5,094,804 A | 3/1992 | Schweitzer |
| 5,268,947 A | 12/1993 | Bastide et al. |
| 5,283,812 A | 2/1994 | Verdier |
| 5,711,826 A | 1/1998 | Nordstrom |
| 5,762,831 A | 6/1998 | Viallard et al. |
| 2007/0100008 A1 | 5/2007 | Chang et al. |

FOREIGN PATENT DOCUMENTS

| | | |
|---|---|---|
| JP | 63-179288 | 7/1988 |
| JP | H01152394 A | 6/1989 |
| JP | 4048295 A | 2/1992 |
| JP | H04-331542 A | 11/1992 |
| JP | 07-120579 | 5/1995 |
| JP | H10104379 A | 4/1998 |
| JP | 2006-337312 A | 12/2006 |
| WO | 03/015105 A2 | 2/2003 |

OTHER PUBLICATIONS

NASA; "NASA STTR 2002 Solicitation Form B—Proposal Summary for 'Refractory Open-Cell Foam Fuel Matrix for High-Efficiency Nuclear Space Propulsion Systems' Proposal No. 02-020014" [Abstract]; NASA; bearing a date of Sep. 5, 2002 and printed on Jan. 6, 2008; pp. 1-2; located at http://sbir.gsfc.nasa.gov/SBIR/abstracts/sttr02.html.

Russian Intellectual Property Office Action; App. No. 2010143718/07 (062996); Oct. 29, 2012; 50 pages total (including machine translation).

Japanese Intellectual Property Office, Office Action; App. No. 2011-503992 (based on PCT Patent Application No. PCT/US2009/002192); Sep. 3, 2013; 9 pages (including machine translation consisting of 5 pages).

Samoilov et al.; "Fuel Elements of Nuclear Reactors"; bearing a date of 1996; pp. 162-170 (20 total pages); Fig. 4.10-4.12 [D2]; Energoatomizdat; Moscow (Machine Translation Provided).

Samoilov et al.; "Dispersion Fuel Elements of Nuclear Reactors"; bearing a date of 1982; pp. 10-11(6 total pages); vol. 1; Table.1.2. [D1]; Energoizdat; Moscow (Machine Translation Provided).

Chinese State Intellectual Property Office; Notification of First Office Action; App. No. 200980118094.X (Based on PCT Patent Application No. PCT/US2009/002192); Dec. 24, 2012 (received by our Agent on Dec. 26, 2012); pp. 1-7; No English Translation Provided.

European Extended Search Report for EP 09730777.1.

* cited by examiner

NUCLEAR FISSION REACTOR FUEL ASSEMBLY ADAPTED TO PERMIT EXPANSION OF THE NUCLEAR FUEL CONTAINED THEREIN

BACKGROUND

This application generally relates to nuclear reactor fuel assemblies and more particularly relates to a nuclear fission reactor fuel assembly adapted to permit expansion of the nuclear fuel contained therein.

It is known that, in an operating nuclear fission reactor, neutrons of a known energy are absorbed by nuclides having a high atomic mass. The resulting compound nucleus separates into fission products that include two lower atomic mass fission fragments and also decay products. Nuclides known to undergo such fission by neutrons of all energies include uranium-233, uranium-235 and plutonium-239, which are fissile nuclides. For example, thermal neutrons having a kinetic energy of 0.0253 ev (electron volts) can be used to fission U-235 nuclei. Thorium-232 and uranium-238, which are fertile nuclides, undergo induced fission, with fast neutrons, which have a kinetic energy of at least 1 MeV (million electron volts). The total kinetic energy released from each fission event is about 200 MeV. This kinetic energy is eventually transformed into heat.

Moreover, the fission process, which starts with an initial source of neutrons, liberates additional neutrons as well as transforms kinetic energy into heat. This results in a self-sustaining fission chain reaction that is accompanied by continued energy release. That is, for every neutron that is absorbed, more than one neutron is liberated until the fissile nuclei are depleted. This phenomenon is used in a commercial nuclear reactor to produce continuous heat that, in turn, is beneficially used to generate electricity.

Fuel assembly expansion due to the aforementioned heat generation and also due to fission product release can occur in such processes. In this regard, fuel assemblies may undergo differential expansion, fuel rod creep that can increase incidence of fuel rod cladding rupture, fission gas pressure build-up, and swelling during reactor operation. This may increase the incidence of fuel pellet cracking and/or fuel rod bowing. Fuel pellet cracking may lead to fission gas release and cause higher than normal radiation levels. Fuel rod bowing may in turn lead to obstruction of coolant flow channels. Safety margins incorporated into the reactor design and precise quality control during manufacture can reduce these incidences or the system design can adapt systems to operate with such incidences.

In one approach to deading with fuel assembly expansion due to heat generation and fission gas release, U.S. Pat. No. 3,028,330 issued Apr. 3, 1962 in the name of Clarence I. Justheim, et al. and titled "Nuclear Fuel Elements Having An Autogenous Matrix And Method Of Making The Same" discloses a cellular carbonaceous matrix. The cells of the cellular matrix can contain fragments of a fissile material, which may be fertile isotopes of uranium enriched with fissionable isotopes. According to this patent, the cells are ordinarily of such size relative to the fission fragments as to allow for increase in volume of the latter resulting from thermal cycling and radiation damage. Although this patent discloses a cellular matrix having cells that allow for increase in volume of fission fragments, this patent does not appear to disclose a nuclear fission reactor fuel assembly, which is adapted to permit expansion of the nuclear fuel contained in the fuel assembly.

Another approach, disclosed in U.S. Pat. No. 3,184,392 issued May 18, 1965 in the name of Leslie Reginald Blake, et al. and titled "Fast Nuclear Reactor Fuel Elements" describes a nuclear reactor fuel element that comprises a body of porous, closed-cell, fissile nuclear fuel which by virtue of the porosity is of dispersed structure and which is enclosed within a cylindrical protective sheath. The fuel provides interstitial voids and the fuel element is only partially filled to leave a void above the fuel. According to this patent, the protective sheath is capable of withstanding an internal pressure of at least 10,000 psi at a temperature of 600° C. and the void above the fuel serves as expansion space for the fuel and also space for accommodation of fission products. Although this patent discloses a nuclear reactor fuel element that comprises a body of porous, closed-cell, fissile nuclear fuel, this patent does not appear to disclose a nuclear fission reactor fuel assembly, which is adapted to permit expansion of the nuclear fuel contained in the fuel assembly, as disclosed and claimed herein.

SUMMARY

According to an aspect of this disclosure, there is provided a nuclear fission reactor fuel assembly, comprising an enclosure adapted to sealingly enclose a nuclear fuel foam defining a plurality of interconnected open-cell voids.

According to another aspect of this disclosure, there is provided a nuclear fission reactor fuel assembly, comprising an enclosure adapted to sealingly enclose a fertile nuclear fuel foam defining a plurality of closed-cell voids.

According to yet another aspect of the disclosure, there is provided a nuclear fission reactor fuel assembly, comprising: an enclosure adapted to sealingly enclose a nuclear fuel foam capable of generating heat, the nuclear fuel foam defining a plurality of interconnected open-cell voids; and a heat absorber associated with the enclosure and adapted to be in heat transfer communication with the nuclear fuel foam for absorbing the heat generated by the nuclear fuel foam.

According to a further aspect of the disclosure, there is provided a nuclear fission reactor fuel assembly, comprising: an enclosure adapted to sealingly enclose a fertile nuclear fuel foam capable of generating heat, the nuclear fuel foam defining a plurality of closed-cell voids; and a heat absorber associated with the enclosure and adapted to be in heat transfer communication with the nuclear fuel foam for absorbing the heat generated by the nuclear fuel foam.

According to another aspect of the disclosure, there is provided a nuclear fission reactor fuel assembly, comprising: an enclosure adapted to sealingly enclose a nuclear fuel foam capable of generating heat, the nuclear fuel foam defining a plurality of interconnected open-cell voids; and a heat absorber conduit extending through the nuclear fuel foam, the heat absorber conduit capable of carrying a cooling fluid therealong in heat transfer communication with the nuclear fuel foam for absorbing the heat generated by the nuclear fuel foam.

According to yet another aspect of the disclosure, there is provided a nuclear fission reactor fuel assembly, comprising: an enclosure adapted to sealingly enclose a nuclear fuel foam capable of generating heat, the nuclear fuel foam defining a plurality of closed-cell voids; and a heat absorber conduit extending through the nuclear fuel foam, the heat absorber conduit capable of carrying a cooling fluid therealong in heat transfer communication with the nuclear fuel foam for absorbing the heat generated by the nuclear fuel foam.

According to a further aspect of the disclosure, there is provided a nuclear fission reactor fuel assembly, comprising: an enclosure; a nuclear fuel foam capable of generating heat, the nuclear fuel foam being sealingly disposed in the enclosure, the nuclear fuel foam defining a plurality of interconnected open-cell voids; and a heat absorber disposed in heat transfer communication with the nuclear fuel foam for absorbing the heat generated by the nuclear fuel foam.

According to still another aspect of the disclosure, there is provided a nuclear fission reactor fuel assembly, comprising: an enclosure; a fertile nuclear fuel foam capable of generating heat, the nuclear fuel foam sealingly disposed in the enclosure, the nuclear fuel foam defining a plurality of closed-cell voids; and a heat absorber disposed in heat transfer communication with the nuclear fuel foam for absorbing the heat generated by the nuclear fuel foam.

According to another aspect of the disclosure, there is provided a nuclear fission reactor fuel assembly, comprising: an enclosure adapted to sealingly enclose a porous uncoated nuclear fuel material defining a plurality of interconnected open-cell voids.

According to yet another aspect of the disclosure, a method includes, but is not limited to, making a nuclear fission reactor fuel assembly, comprising the step of providing an enclosure to sealingly enclose a nuclear fuel foam defining a plurality of interconnected open-cell voids.

According to yet another aspect of the disclosure, a method includes, but is not limited to, making a nuclear fission reactor fuel assembly, comprising the step of providing an enclosure to sealingly enclose a fertile nuclear fuel foam defining a plurality of closed-cell voids.

According to a further aspect of the disclosure, a method includes, but is not limited to, operating a nuclear fission reactor fuel assembly, comprising the step of disposing an enclosure in a nuclear reactor vessel, the enclosure sealingly enclosing a nuclear fuel foam defining a plurality of interconnected open-cell voids.

According to yet another aspect of the disclosure, a method includes, but is not limited to, operating a nuclear fission reactor fuel assembly, comprising the step of disposing an enclosure in a nuclear reactor vessel, the enclosure sealingly enclosing a fertile nuclear fuel foam defining a plurality of closed-cell voids.

In addition to the foregoing, other method aspects are described in the claims, drawings, and text forming a part of the present disclosure.

A feature of the present disclosure is the provision of an enclosure adapted to sealingly enclose a nuclear fuel foam defining a plurality of interconnected open-cell voids.

Another feature of the present disclosure is the provision of an enclosure adapted to sealingly enclose a fertile nuclear fuel foam defining a plurality of closed-cell voids.

In addition to the foregoing, various other method and/or device aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

While the specification concludes with claims particularly pointing-out and distinctly claiming the subject matter of the present disclosure, it is believed the disclosure will be better understood from the following detailed description when taken in conjunction with the accompanying drawings. In addition, the use of the same symbols in different drawings will typically indicate similar or identical items.

DETAILED DESCRIPTION

Figure 1:
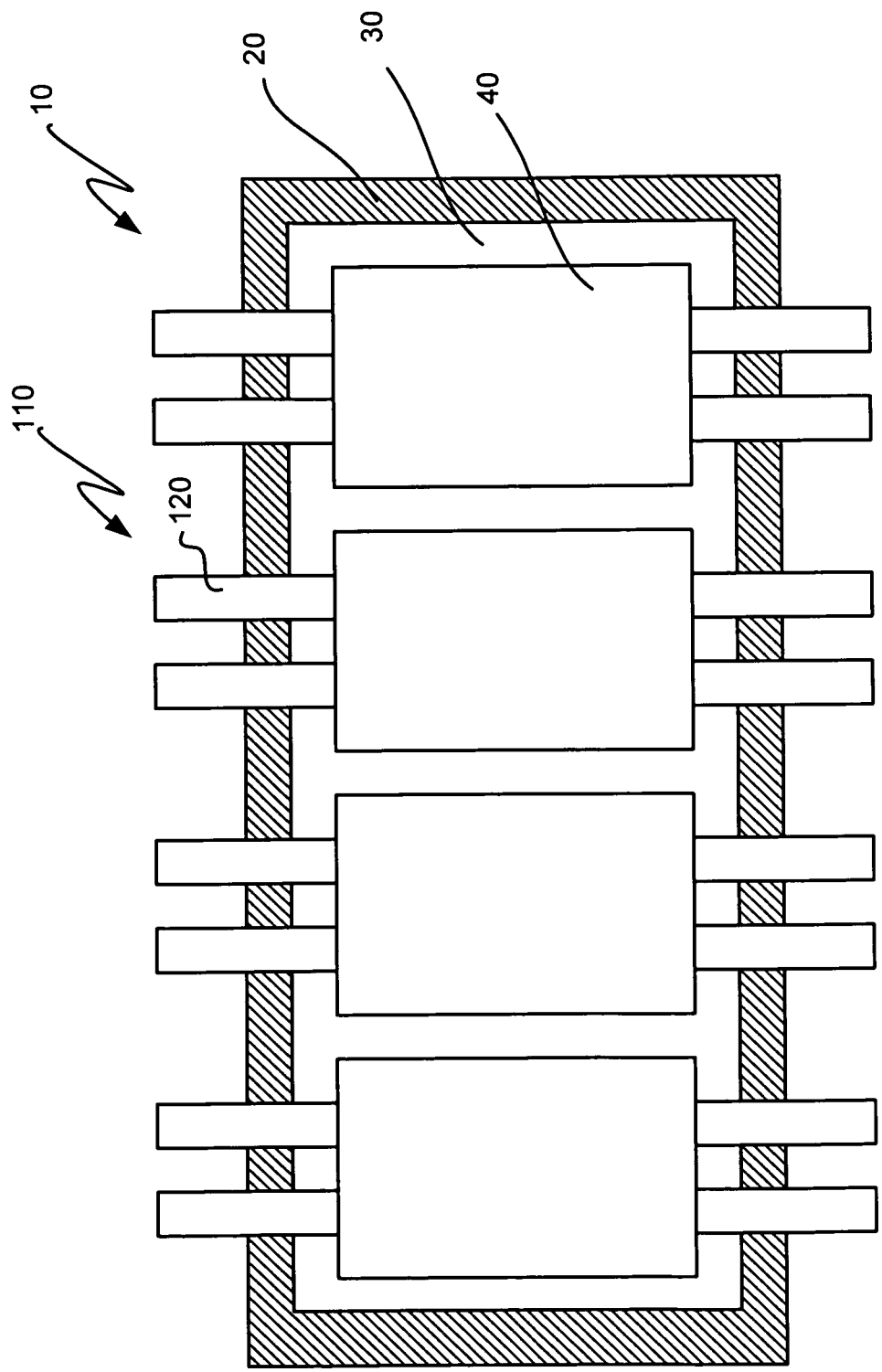
FIG. 1 is a view in partial elevation of a nuclear fission reactor with parts removed for clarity, this view also showing a plurality of generally cylindrical nuclear fission reactor fuel assemblies belonging to the reactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

In addition, the present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Moreover, the herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Therefore, turning to FIG. 1, there is shown a nuclear fission reactor, generally referred to as 10, for producing heat due to fission of a fissile nuclide, such as uranium-235, uranium-233, or plutonium-239. Reactor 10 may be a "traveling wave" reactor. In this regard, a traveling wave reactor includes a reactor core. A nuclear fission igniter in the reactor core initiates a fission deflagration wave burnfront. After the nuclear fuel in the core is ignited by the fission igniter, the fission deflagration wave burnfront is initiated and propagates throughout the nuclear fuel. In one embodiment, during this fission process, reactor coolant loops transfer heat from the reactor core to heat exchangers for producing steam. The steam is transferred to a turbine-generator for generating electricity.

Such a traveling wave reactor is disclosed in more detail in co-pending U.S. patent application Ser. No. 11/605,943 filed Nov. 28, 2006 in the names of Roderick A. Hyde, et al. and titled "Automated Nuclear Power Reactor For Long-Term Operation", which application is assigned to the assignee of the present application, the entire disclosure of which is hereby incorporated by reference.

Still referring to FIG. 1, reactor 10 comprises a vessel 20, such as a pressure vessel or containment vessel, for preventing leakage of radioactive particles, gasses or liquids from reactor 10 to the surrounding environment. Vessel 20 may be steel, concrete or other material of suitable size and thickness to reduce risk of such radiation leakage and to support required pressure loads. Although only one vessel 20 is shown, there may be additional containment vessels, one enveloping the other, for added safety. Vessel 20 defines a well 30 therein in which is disposed one or more nuclear fission reactor fuel assemblies 40, as described in more detail hereinbelow.

Figure 2:
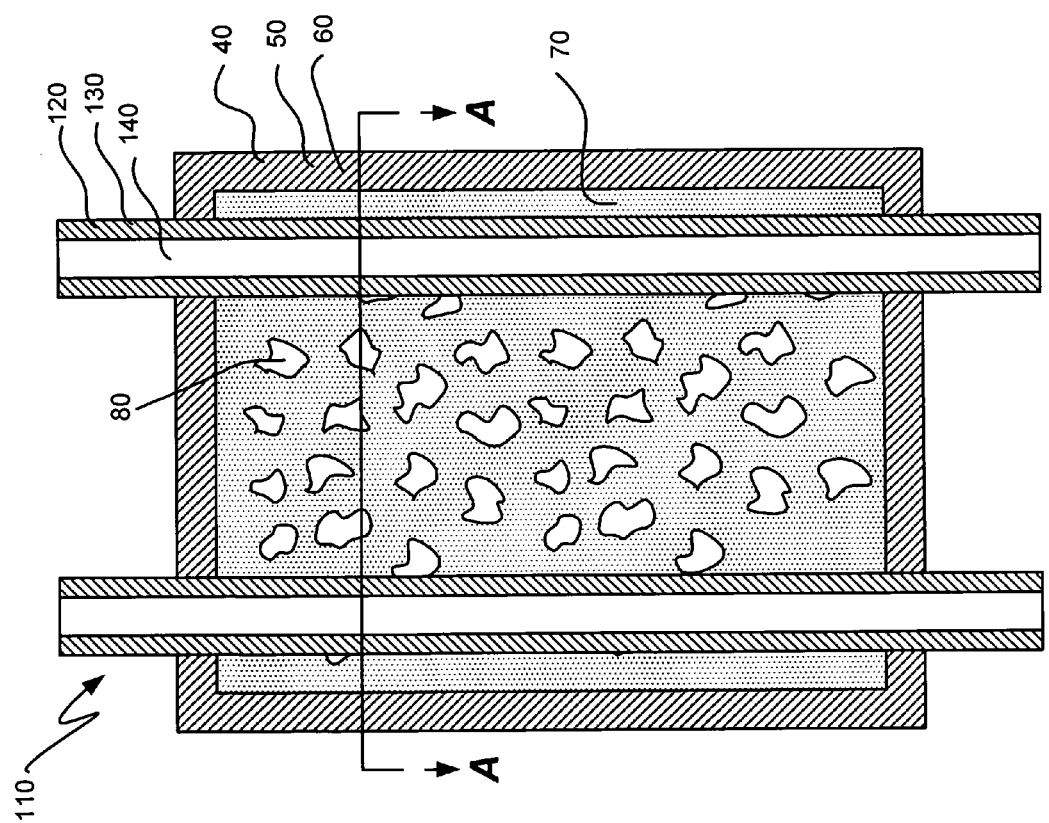
FIG. 2 is a view in vertical section of one of the nuclear fission reactor fuel assemblies and shows a nuclear fuel foam therein.
Figure 3:
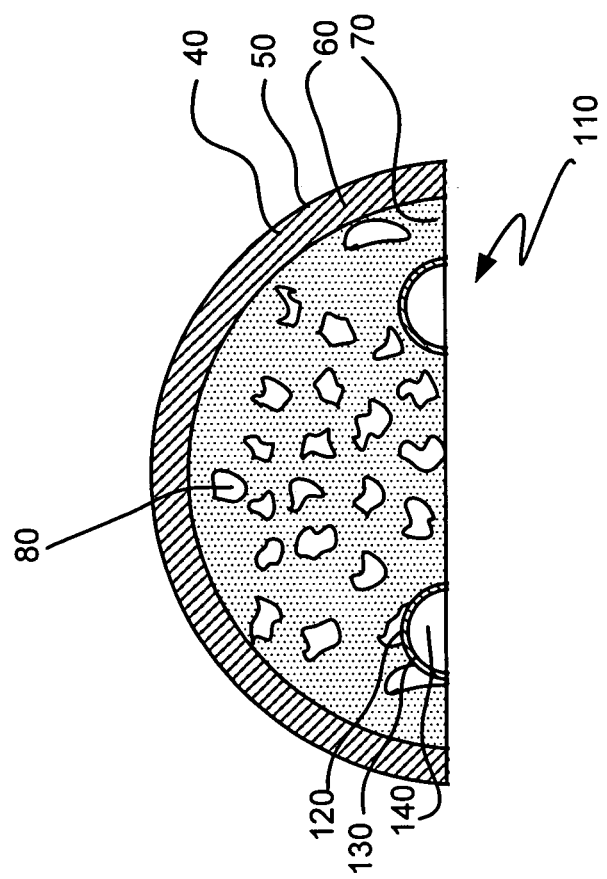
FIG. 3 is a view taken along section line A-A of FIG. 2.
Figure 4:
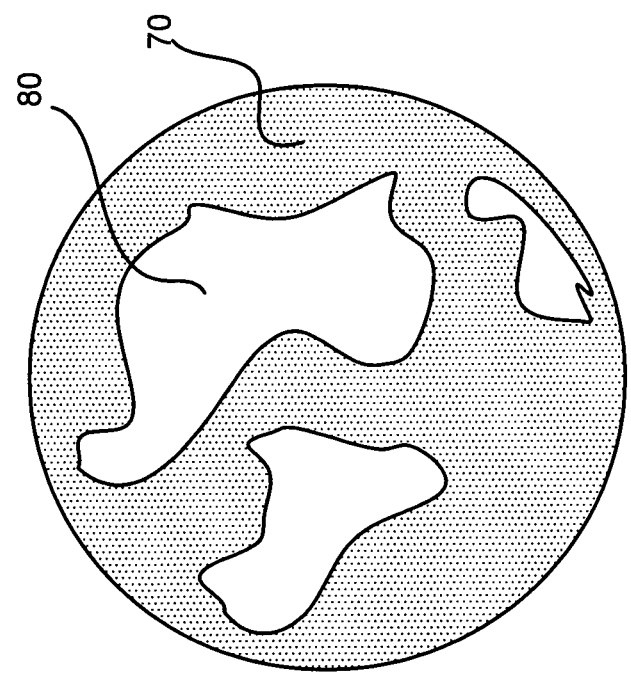
FIG. 4 is a magnified view of an uncoated nuclear fuel foam defining closed-cell voids therein.

As best seen in FIGS. 2, 3 and 4, each nuclear fission reactor fuel assembly 40 comprises a generally cylindrical enclosure 50 having enclosure walls 60 for sealingly enclosing a nuclear fuel foam 70 therein. Foam 70 defines a plurality of closed-cell voids 80 spatially distributed within it. As used herein, the terminology "closed-cell voids" means that each void 80 is separated from and typically not interconnected to its neighboring void 80, such that substantial amounts of gas, liquid, or fluid do not directly travel between voids 80.

Figure 5:
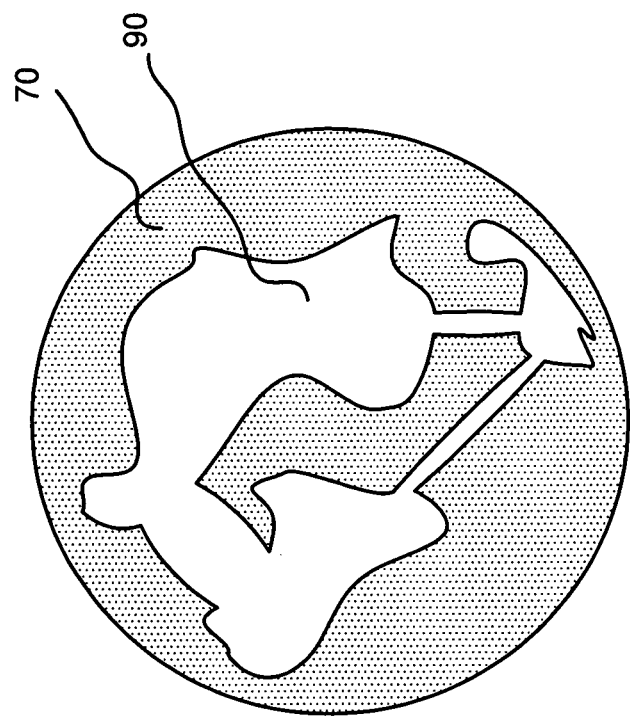
FIG. 5 is a magnified view of an uncoated nuclear fuel foam defining open-cell voids therein.

As seen in FIG. 5, foam or porous material 70 may alternatively define a plurality of interconnected open-cell voids 90 spatially distributed within it. As used herein, the terminology "open-cell voids" means that each void is typically connected to one or more of its neighbors, permitting gas, liquid, or fluid to directly travel between voids 90. The open-cell voids may be defined by a foam fuel material having a web-like or honeycomb structure. The open-cell voids may be defined by a porous fuel material having a fibrous or rod-like structure, or a porous fuel material formed by an interconnected collection of fuel particles (such as sintered beads or packed spheres). Also, the open-cell voids may be defined by fuel material having a mixture of foam or porous characteristics.

Foam or porous material 70 may comprise a fissile nuclear fuel, such as uranium-233, uranium-235 and/or plutonium-239. Alternatively, foam 70 may comprise a fertile nuclear fuel, such as thorium-232 and/or uranium-238. A further alternative is that foam or porous material 70 may comprise a predetermined mixture of fissile and fertile nuclear fuel.

It will be appreciated by a person of ordinary skill in the art that fuel assembly 40 may be disposed in a thermal neutron reactor, a fast neutron reactor, a neutron breeder reactor, a fast neutron breeder reactor or the previously mentioned traveling wave reactor. Thus, fuel assembly 40 is versatile enough to be beneficially used in various nuclear reactor designs.

With reference to FIGS. 2, 3, 4 and 5, it will be understood that a purpose of each void 80 and 90 is to provide a shrinkable volume that is adapted to accommodate or permit expansion of foam or porous material 70 due to thermal expansion and fission product gas release during operation of reactor 10. Overall, void volume of foam or porous material 70 may be approximately 20% to approximately 97% to permit the expansion, although in come cases percentages outside of this range may be producible. Accommodating expansion of foam or porous material 70 in this manner reduces pressure on enclosure walls 60 because foam or porous material 70 will expand toward or even into voids 80 or 90 rather than expand against walls 60. Therefore, this structure is typically configured such that foam or porous material 70 expands inwardly toward voids 80 or 90 rather than outwardly against enclosure walls 60 to exert pressure on enclosure walls 60. Reducing pressure on enclosure walls 60 in turn reduces risk of enclosure 50 swelling and enclosure walls 60 cracking, both of which might otherwise lead to release of fission products.

With reference to FIG. 5, it will be understood that a purpose of the interconnected open-cell voids 90 is to provide a path to facilitate transport of volatile fission products generated by the nuclear fuel foam or porous material 70. Such fission products may be isotopes of iodine, bromine, cesium, potassium, rubidium, strontium, xenon, krypton, barium or other gaseous or volatile materials. Such a transport path may provide a vehicle to remove a portion of fission products from neutronically active regions of the nuclear fission reactor fuel assembly 40. Such removal may reduce neutron absorption by fission products.

Referring to FIGS. 2, 3, 4, and 5, foam or porous material 70 may substantially comprise a metal, such as uranium, thorium, plutonium, or alloys thereof. Alternatively, foam or porous material 70 may substantially comprise a carbide, such as uranium carbide (UC or $UC_x$) or thorium carbide ($ThC_2$ or $ThC_x$). The uranium carbide or thorium carbide may be sputtered into a matrix of niobium carbide (NbC) and zirconium carbide (ZrC). A potential benefit of using niobium carbide and zirconium carbide is that they form a refractory structural substrate for the uranium carbide or thorium carbide. Foam or porous material 70 may also substantially comprise an oxide, such as uranium dioxide ($UO_2$); thorium dioxide ($ThO_2$), which is also referred to as thorium oxide; or uranium oxide ($U_3O_8$). On the other hand, foam or porous material 70 may be a nitride, such as uranium nitride ($U_2N_3$) or thorium nitride (ThN). Moreover, the discussion hereinabove related to foam or porous material 70 as being uncoated. If desired, foam or porous material 70 may be coated with a suitable material.

Figure 6:
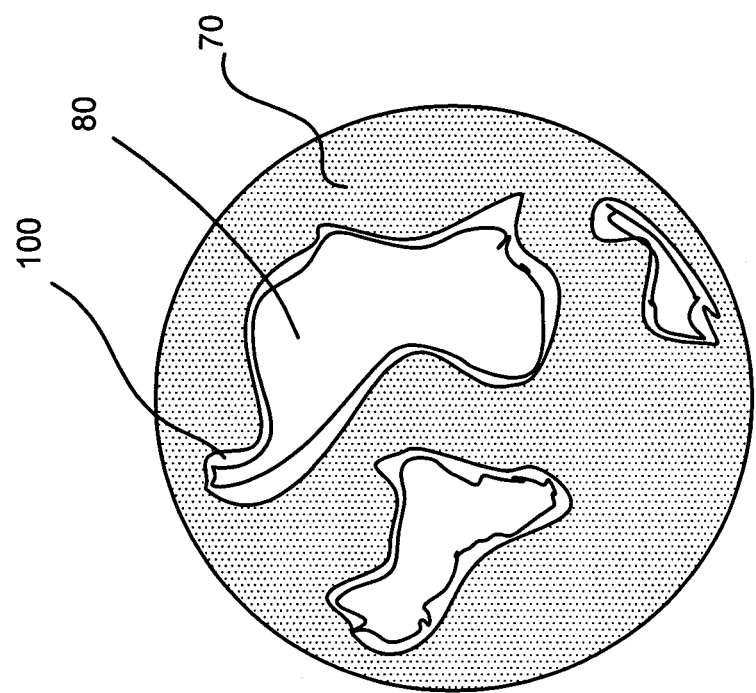
FIG. 6 is a magnified view of a coated nuclear fuel foam defining closed-cell voids therein.
Figure 7:
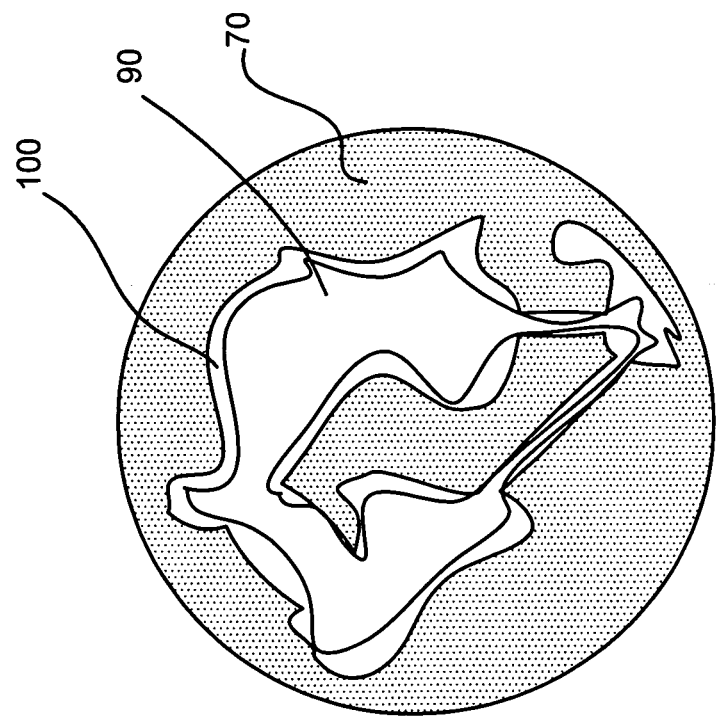
FIG. 7 is a magnified view of a coated nuclear fuel foam defining open-cell voids therein.

Referring to FIGS. 6 and 7, foam or porous material 70 may be coated with a coating layer 100, which may comprise carbon, zirconium carbide or the like. Processes to achieve the desired coating may be electro-plating, electro-less deposition, vapor deposition, ion deposition or any other suitable process. The coating foam or porous material 70 may provide a barrier to escape of fission products from foam or porous material 70 into voids 80 or 90. Such fission products may be isotopes of iodine, bromine, cesium, potassium, rubidium, strontium, xenon, krypton, barium or other gaseous or volatile materials. Coating foam or porous material 70 may also or alternatively provide structural support to the foam or porous material 70.

Returning to FIG. 2, a heat absorber, generally referred to as 110, is associated with enclosure 50 and is adapted to be in heat transfer communication with foam or porous material 70 for absorbing fission heat generated by foam or porous material 70. By way of example only, and not by way of limitation, heat absorber 110 may comprise a plurality of generally cylindrical parallel conduits or pipes 120 extending through foam or porous material 70. Each pipe 120 has a pipe wall 130 defining a flow channel 140 for reasons described presently. Pipes 120 may be fabricated from refractory metals or alloys such as Niobium (Nb), Tantalum (Ta), tungsten (W) or the like. The reactor coolant pipes 120 may be made from other materials such as aluminum (Al), steel or other ferrous or non-iron group alloys or titanium or zirconium-based alloys, or from other suitable metals and alloys. A coolant, such as pressurized gas (not shown), flows along flow channel 140 for absorbing heat from foam or porous material 70 by means of heat conduction through pipe wall 130. The reactor coolant may be selected from several pressurized inert gases, such as helium, neon, argon, krypton, xenon, or mixtures thereof. Alternatively, the coolant may be water, or gaseous or superfluidic carbon dioxide, or liquid metals, such as sodium or lead, or liquid metal alloys, such as lead-bismuth (Pb—Bi), or organic coolants, such as polyphenyls, or fluorocarbons. Alternatively, the coolant may be a phase-changing composition, such as water, potassium (K) or sodium (Na). On the other hand, the heat absorber 110 may be a thermoelectric material, such as bismuth telluride ($Bi_2Te_3$); lead telluride (PbTe); or zinc antimonide($Zn_4Sb_3$). It is appreciated by those of ordinary skill in the art that heat absorber 110 or pipes 120 need not be parallel, as shown; rather, heat absorber 110 or pipes 120 may be set at criss-cross angles with respect to each other, if desired.

Figure 8:
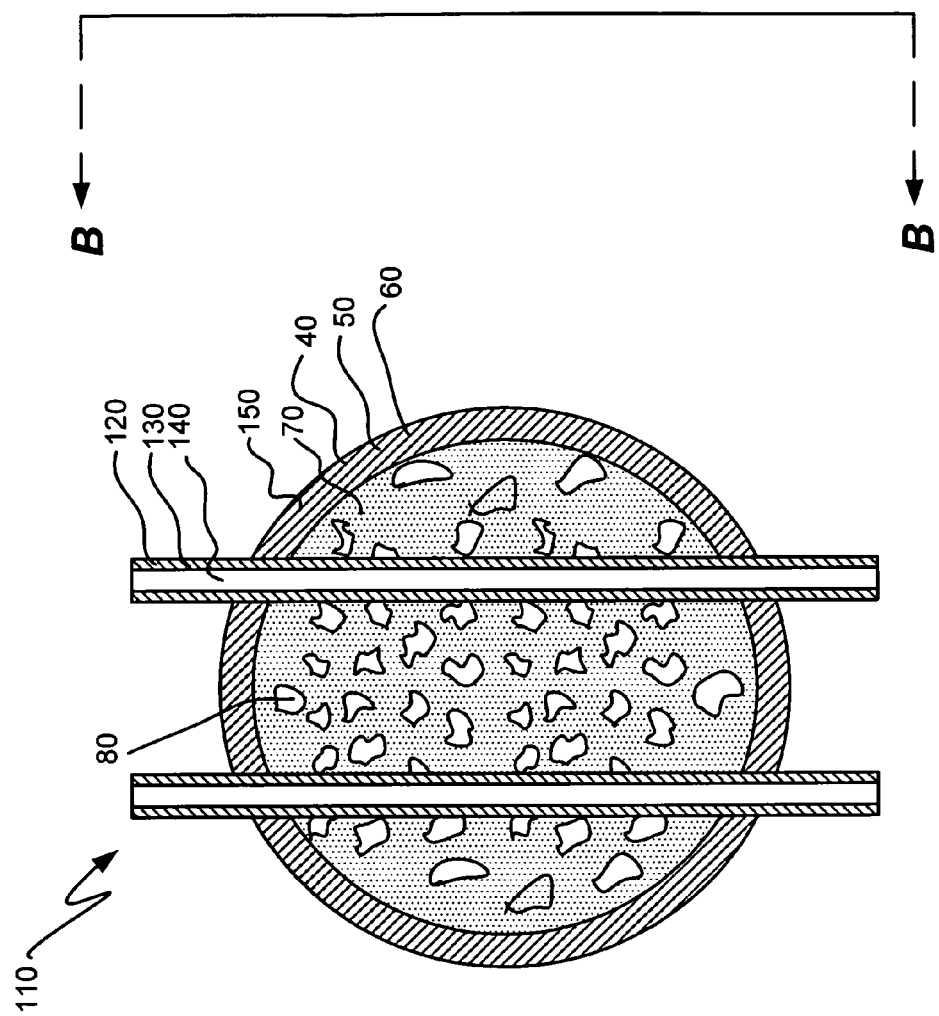
FIG. 8 is a view in vertical section of a generally spherical nuclear fission reactor fuel assembly.
Figure 9:
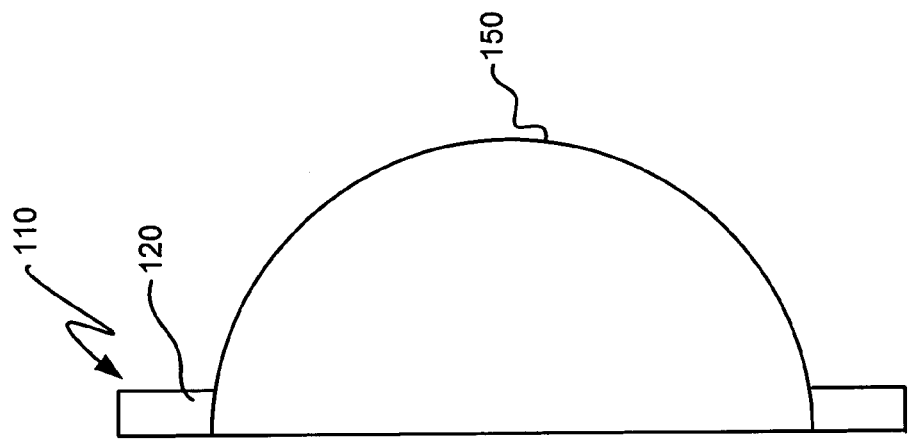
FIG. 9 is a view taken along section line B-B of FIG. 8.

Turning now to FIGS. 8 and 9, an alternative embodiment of fuel assembly 40 is there shown. In this alternative embodiment, fuel assembly 40 comprises a generally spherical enclosure 150, rather than the previously mentioned generally cylindrical enclosure 50. The spherical enclosure 150 may reduce the amount of cladding material required. The spherical enclosure 150 may also help shape fuel profiles.

Figure 10:
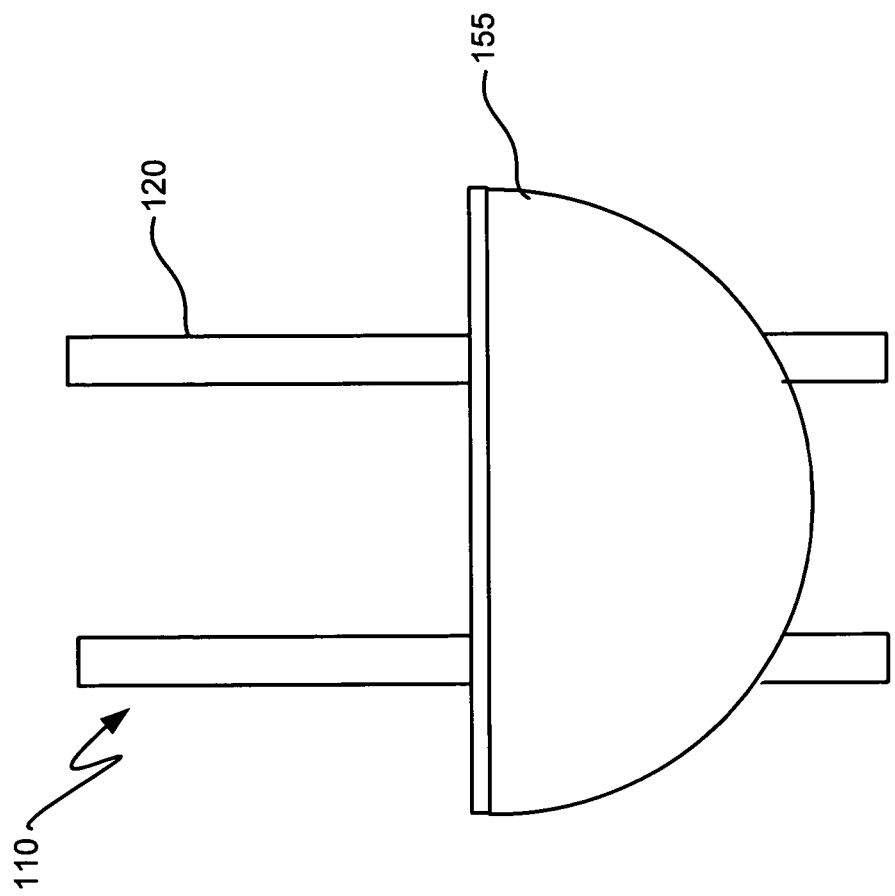
FIG. 10 is a view in elevation of a generally hemi-spherical nuclear fission reactor fuel assembly.
Figure 11:
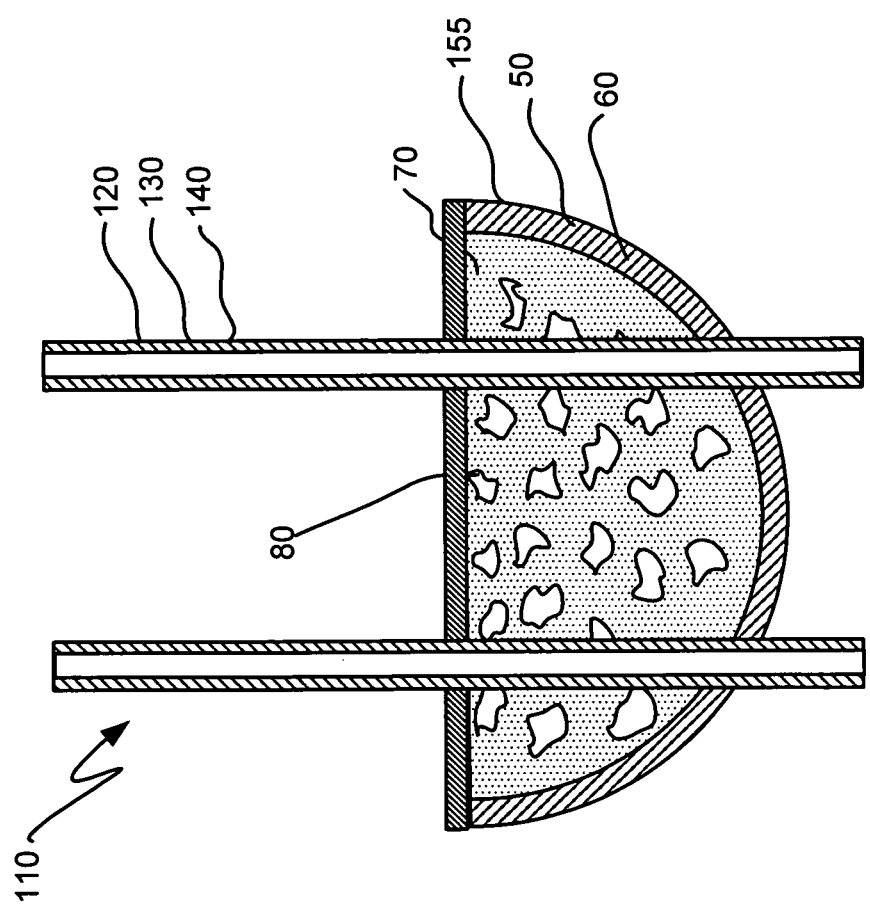
FIG. 11 is a view in vertical section of the hemi-spherical nuclear fission reactor fuel assembly.

Referring to FIGS. 10 and 11, yet another alternative embodiment of fuel assembly 40 is there shown. In this alternative embodiment, fuel assembly 40 comprises a generally disk-shaped enclosure 160. A potential benefit to using the disk-shaped enclosure 160 is its utility in shaping fuel profiles.

Figure 12:
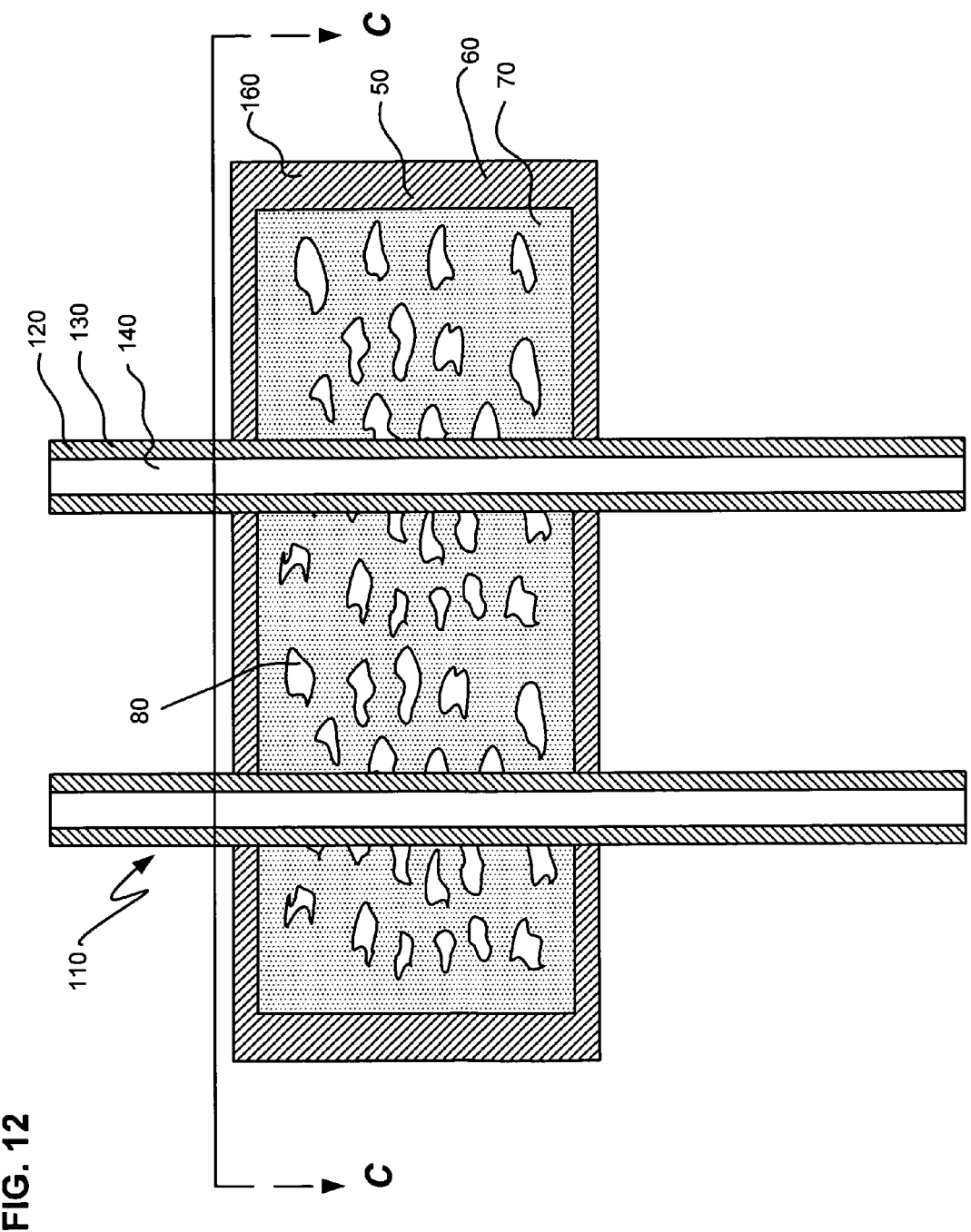
FIG. 12 is a view in vertical section of a generally disk-shaped nuclear fission reactor fuel assembly.
Figure 13:
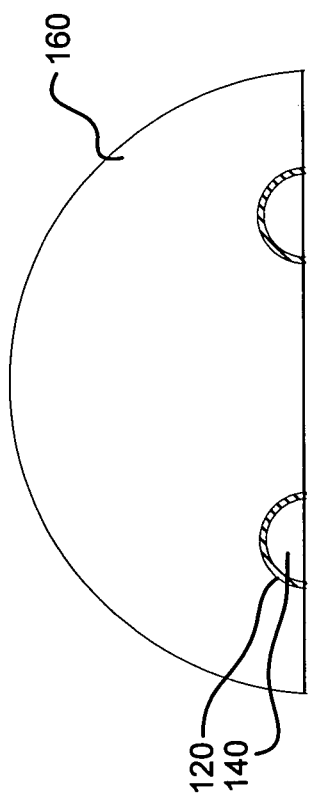
FIG. 13 is a view taken along section line C-C of FIG. 12.

Referring to FIGS. 12 and 13, another alternative embodiment of fuel assembly 40 is there shown. In this alternative embodiment, fuel assembly 40 comprises a generally hemi-spherical enclosure 155. The_hemi-spherical enclosure 155 may increase fuel assembly packing densities in well 30. As with the spherical profile, the hemi-spherical enclosure 155 may aid in shaping fuel profiles.

Figure 14:
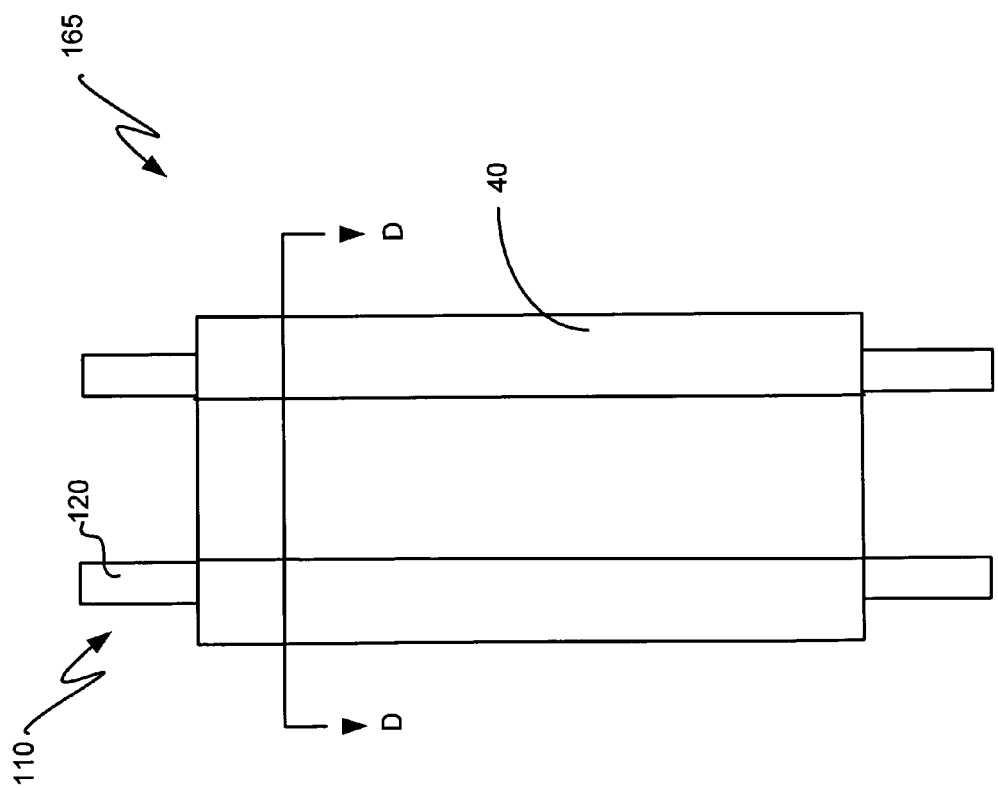
FIG. 14 is a view in elevation of a generally hexagonally shaped nuclear fission reactor fuel assembly.
Figure 15:
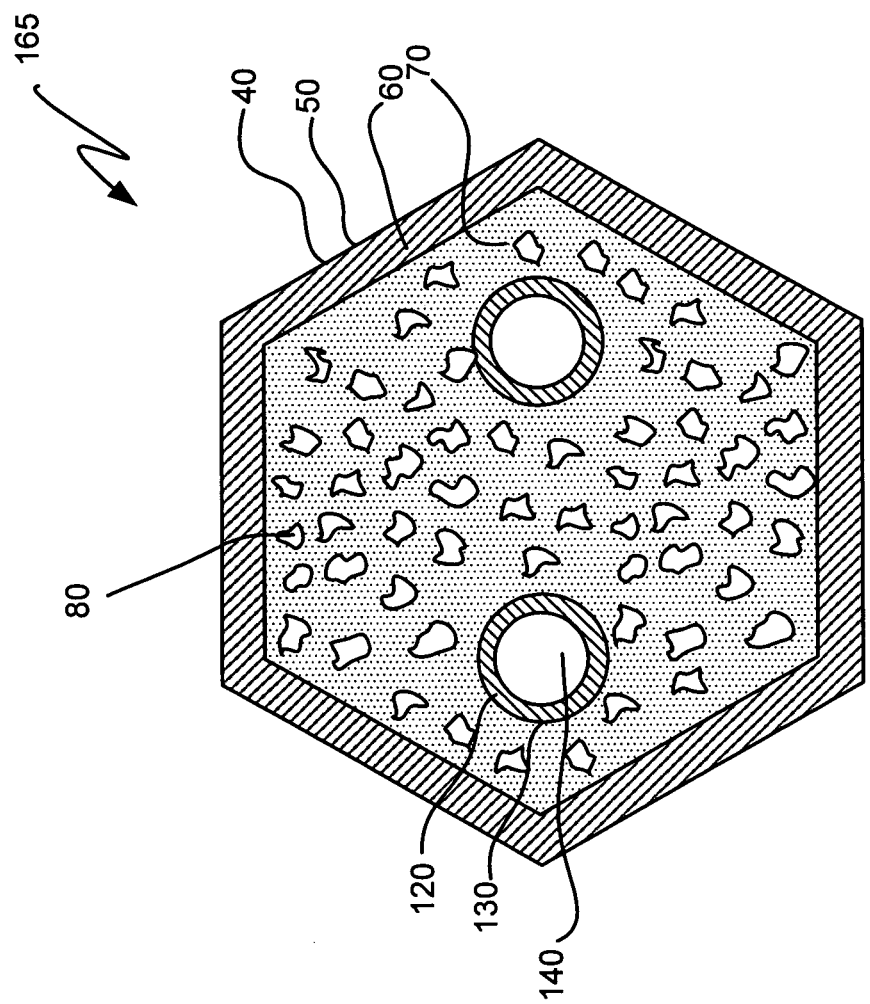
FIG. 15 is a view taken along section line D-D of FIG. 14.

Referring to FIGS. 14 and 15, still another embodiment of fuel assembly 40 is there shown. In this alternative embodiment, fuel assembly 40 comprises a polygonal-shaped (in transverse cross-section) enclosure 165. In this regard, enclosure 165 may have a hexagon shape in transverse cross section. A potential benefit to using the hexagonally shaped cross section of enclosure 165 is that more fuel assemblies 40 may provide relatively high packing factors in some configurations and increase the number of fuel assemblies packed into well 30 over some other geometric shapes for the fuel assembly. As with the previous embodiments, the hexagonally shaped cross section of enclosure 165 may assist in shaping fuel profiles.

Figure 16:
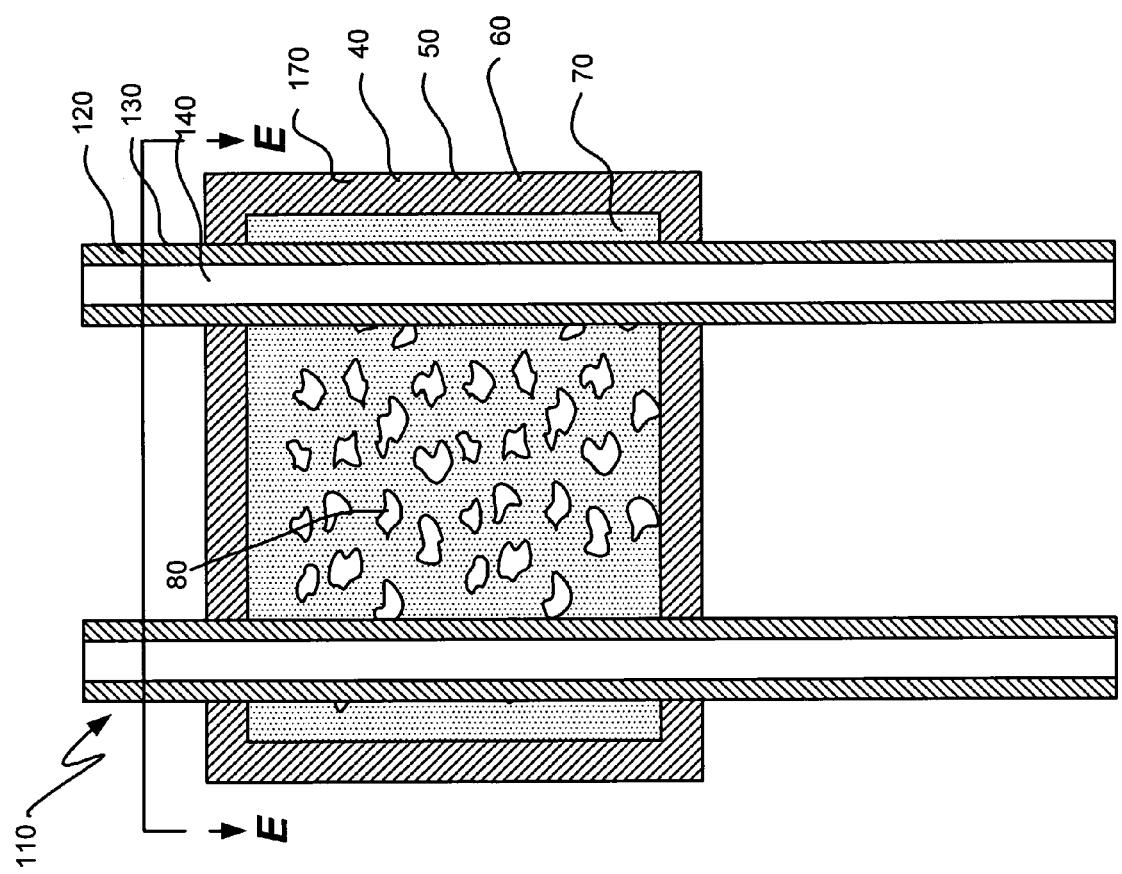
FIG. 16 is a view in vertical section of a nuclear fission reactor fuel assembly having a generally parallelepiped configuration.
Figure 17:
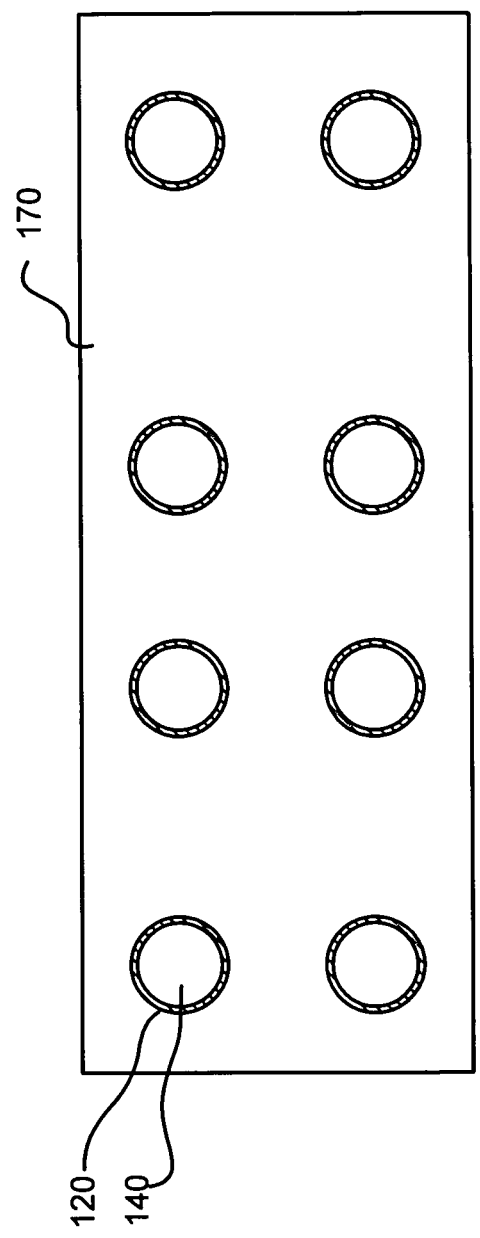
FIG. 17 is a view taken along section line E-E of FIG. 16.

Referring to FIGS. 16 and 17, yet another alternative embodiment of fuel assembly 40 is there shown. In this alternative embodiment, fuel assembly 40 comprises a parallelepiped-shaped enclosure 170. The parallelepiped-shaped enclosure 170 may also provide relatively high packing density in well 30. As with the previous embodiments, the parallelepiped-shaped enclosure 170 may assist in shaping fuel profiles.

Figure 18:
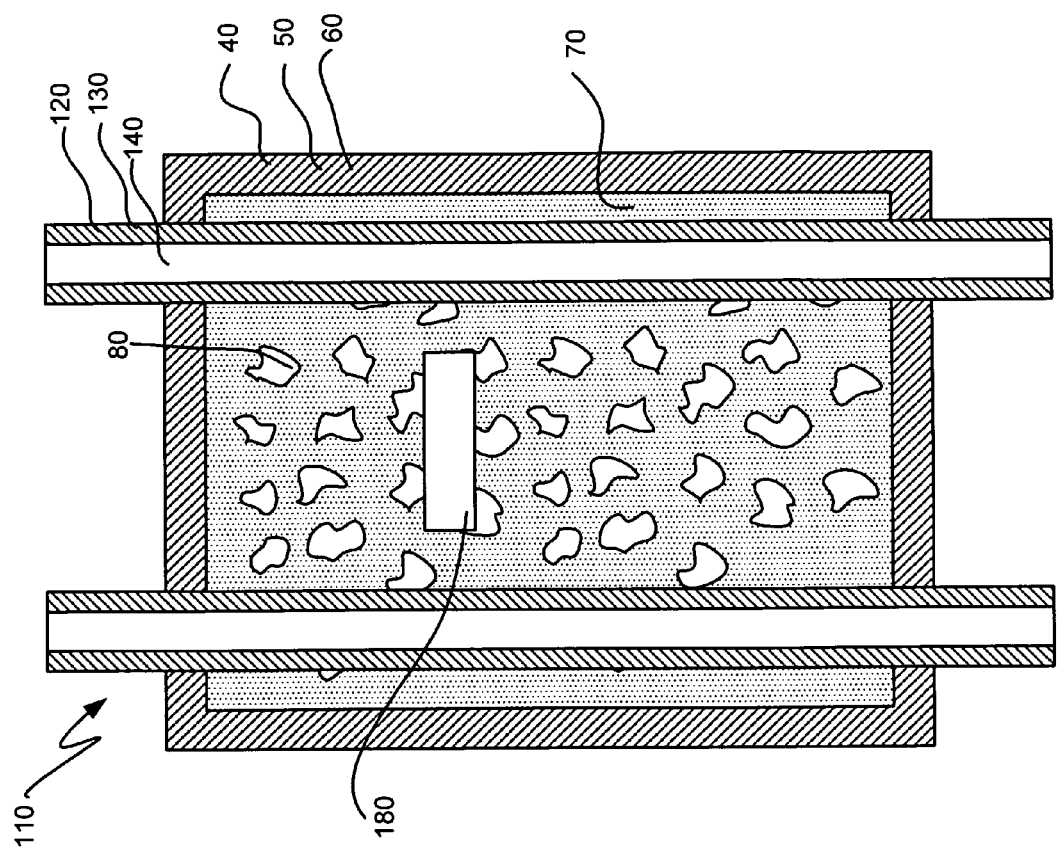
FIG. 18 is a view in vertical section of the nuclear fission reactor fuel assembly having a nuclear fuel pellet embedded in the nuclear fuel foam, the size of the fuel pellet being exaggerated for clarity.

Referring to FIG. 18, foam or porous material 70 may include one or more fuel pellets 180 embedded therein. In one embodiment, fuel pellet 180 may serve as an initial source of reactivity for starting the previously mentioned fission chain reaction. In another embodiment, fuel pellet 180 may serve as a higher density fuel component to increase the effective density of the nuclear fuel material.

As reactor 10 is operated, foam or porous material 70 will tend to expand. This can occur because during operation of reactor 10, foam or porous material 70 will undergo thermal expansion due to fission heat generated by foam or porous material 70 during the fission process. Fission gasses will also be produced due to the fission process. These two phenomena will tend to expand foam or porous material 70, which in turn may tend to put pressure on enclosure wall 60. Such pressure may increase the risk of a breach of enclosure wall 60 and subsequent release of fission products from fuel assembly 40. The foam or porous material 70 disclosed herein addresses this effect by providing shrinkable voids 80 and 90. In other words, voids 80 and 90 can accommodate or permit expansion of foam or porous material 70 by being reduced in volume as foam or porous material 70 expands toward voids 80 and 90. In this manner, the potential pressure increase on wall 60 is reduced and risk of fission product release from fuel assembly 40 is likewise reduced.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Moreover, those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Therefore, what is provided is a nuclear fission reactor fuel assembly, as described and claimed herein, which is adapted to permit expansion of the nuclear fuel contained in the fuel assembly.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of operating a nuclear fission reactor fuel assembly, comprising the step of disposing an enclosure in a nuclear reactor vessel, said enclosure sealingly enclosing a nuclear fuel foam defining a plurality of interconnected open-cell voids within the nuclear fuel foam.

2. The method according to claim 1, wherein the step of disposing the enclosure comprises disposing the enclosure so as to sealingly enclose a nuclear fuel foam defining a plurality of spatially distributed open-cell voids within the nuclear fuel foam to facilitate transport of volatile fission products generated by the nuclear fuel foam.

3. The method according to claim 1, wherein the step of disposing the enclosure comprises disposing the enclosure so as to sealingly enclose a nuclear fuel foam defining a plurality of spatially distributed open-cell voids within the nuclear fuel foam to permit expansion of the nuclear fuel foam.

4. The method according to claim 1, wherein the step of disposing the enclosure comprises disposing the enclosure so as to sealingly enclose a fissile nuclear fuel foam defining a plurality of interconnected open-cell voids within the nuclear fuel foam.

5. The method according to claim 1, wherein the step of disposing the enclosure comprises disposing the enclosure so as to sealingly enclose a fertile nuclear fuel foam defining a plurality of interconnected open-cell voids within the nuclear fuel foam.

6. The method according to claim 1, wherein the step of disposing the enclosure comprises disposing the enclosure so as to sealingly enclose a thorium nuclear fuel foam defining a plurality of interconnected open-cell voids within the nuclear fuel foam.

7. The method according to claim 1, wherein the step of disposing the enclosure comprises disposing the enclosure so as to sealingly enclose a uranium nuclear fuel foam defining a plurality of interconnected open-cell voids within the nuclear fuel foam.

8. The method according to claim 1, wherein the step of disposing the enclosure comprises disposing the enclosure so as to sealingly enclose a mixture of fissile and fertile nuclear fuel foam defining a plurality of interconnected open-cell voids within the nuclear fuel foam.

9. The method according to claim 1, wherein the step of disposing the enclosure comprises disposing the enclosure so as to sealingly enclose an uncoated nuclear fuel foam defining a plurality of interconnected open-cell voids within the nuclear fuel foam.

10. The method according to claim 1, wherein the step of disposing the enclosure comprises disposing the enclosure so as to sealingly enclose an oxide nuclear fuel foam defining a plurality of interconnected open-cell voids within the nuclear fuel foam.

11. The method according to claim 1, wherein the step of disposing the enclosure comprises disposing the enclosure so as to sealingly enclose a nitride nuclear fuel foam defining a plurality of interconnected open-cell voids within the nuclear fuel foam.

12. The method according to claim 1, wherein the step of disposing the enclosure comprises disposing the enclosure so that the enclosure is capable of being disposed in a fast neutron nuclear reactor and is capable of sealingly enclosing a nuclear fuel foam defining a plurality of interconnected open-cell voids within the nuclear fuel foam.

13. The method according to claim 1, wherein the step of disposing the enclosure comprises disposing the enclosure so as to sealingly enclose a nuclear fuel foam having a polygonal-shaped geometry in transverse cross-section.

14. The method according to claim 1, wherein the step of disposing the enclosure comprises disposing the enclosure so as to sealingly enclose a nuclear fuel foam having a parallelepiped geometry.

15. The method according to claim 1, further comprising the step of associating a heat absorber with said enclosure, the heat absorber adapted to be in heat transfer communication with the nuclear fuel foam for absorbing the heat generated by the nuclear fuel foam.

16. The method according to claim 15, wherein the step of associating the heat absorber comprises associating the heat absorber that is a flowing fluid.

17. The method according to claim 1, wherein the step of associating the heat absorber comprises associating the heat absorber that is a phase-changing composition.

18. The method according to claim 1, wherein the step of associating the heat absorber comprises associating the heat absorber that is a thermo-electric material.

19. The method according to claim 15, wherein the step of associating the heat absorber with the enclosure comprises extending a heat absorber conduit through the nuclear fuel foam, the heat absorber conduit being capable of carrying a cooling fluid therealong in heat transfer communication with the nuclear fuel foam for absorbing the heat generated by the nuclear fuel foam.

20. A method of operating a nuclear fission reactor fuel assembly, the method comprising:
fissioning with a nuclear fission reactor fuel assembly having nuclear fuel foam sealingly disposed therein, the nuclear fuel foam defining a plurality of interconnected open-cell voids within the nuclear fuel foam;
generating volatile fission products by the nuclear fuel foam; and
transporting, in the plurality of interconnected open-cell voids within the nuclear fuel foam, the volatile fission products generated by the nuclear fuel foam.

21. A method of operating a nuclear fission reactor fuel assembly, the method comprising:
fissioning with a nuclear fission reactor fuel assembly having nuclear fuel foam sealingly disposed therein, the nuclear fuel foam defining a plurality of interconnected open-cell voids within the nuclear fuel foam;
generating volatile fission products by the nuclear fuel foam; and
expanding the nuclear fuel foam into the plurality of interconnected open-cell voids within the nuclear fuel foam.

* * * * *